United States Patent [19]

Grabitz

[11] Patent Number: 5,624,710
[45] Date of Patent: Apr. 29, 1997

[54] METHOD FOR PREPARING HIGH-DRUG-CONTENT MIXTURES SUITABLE FOR UNIFORM DISTRIBUTION IN FEEDS

[75] Inventor: Ernst B. Grabitz, Casatenovo, Italy

[73] Assignee: Dox-AL Italia S.p.A., Correzzana, Italy

[21] Appl. No.: 359,114

[22] Filed: Dec. 19, 1994

[30] Foreign Application Priority Data

Dec. 17, 1993 [IT] Italy ............................ MI93A2654

[51] Int. Cl.⁶ ............................................. B05D 7/00
[52] U.S. Cl. ........................ 427/212; 427/220; 427/221; 427/333; 426/805; 426/807
[58] Field of Search ........................ 427/220, 221, 427/333, 212; 426/805, 807

[56] References Cited

U.S. PATENT DOCUMENTS

| 2,890,980 | 6/1959 | Hotchkiss et al. | 424/442 |
| 3,495,988 | 2/1970 | Balassa | 426/321 |
| 4,252,831 | 2/1981 | Gleckler et al. | 427/220 |

FOREIGN PATENT DOCUMENTS

| 0363733 | 4/1990 | European Pat. Off. |
| 2447748 | 8/1980 | France. |
| 2584088 | 1/1987 | France. |
| 2016043 | 9/1979 | United Kingdom. |
| 9013361 | 11/1990 | WIPO. |

OTHER PUBLICATIONS

Conduite du Mélange, Revue De l'Alimentation Animale, Dec. 1989, pp. 27–29.

Héléné Nivet, Aspects Pratiques Du Mélange, ibid., Dec. 1989, pp. 30–31.

Deasy, Patrick B., Microencapsulation and Related Drug Processes, pp. 42–43, 82–83.

*Primary Examiner*—Shrive Beck
*Assistant Examiner*—David M. Maiorana
*Attorney, Agent, or Firm*—Kenyon & Kenyon

[57] ABSTRACT

Method for the preparation of premixes for zootechnic and veterinary use, suitable for uniform distribution in feeds, consisting in coating the granule cores made of feed-grade organic material with a layer made of water-soluble materials, with an active ingredient being incorporated therein or firmly fixed thereto, the formation of said layer being obtained by mixing the ingredients fed in an appropriate order, in a mixer for powders, in the presence of an antitacking agent.

23 Claims, No Drawings

METHOD FOR PREPARING HIGH-DRUG-CONTENT MIXTURES SUITABLE FOR UNIFORM DISTRIBUTION IN FEEDS

SCOPE OF THE INVENTION

It is an object of the present invention to prepare mixtures containing active ingredients in high amounts (premixes for zootechnic and veterinary use), which may be easily and safely mixed with feeds to obtain, as end product, a feed containing the active ingredient in a predetermined exact amount, distributed in a perfectly uniform way.

PRIOR ART

As known, the preparation of feeds containing active ingredients in rigorously dosed amounts and at very low concentrations raises considerable difficulties and inconveniences. A uniform distribution of small amounts of active ingredient in a large mass of feed, mostly in the form of granular powder consisting of various components of very different particle sizes, e.g. meals, flours, milled products, can be hardly obtained because of the difference in particle size, specific weight, hydrophilic and lipophilic characteristics between feed and active ingredient.

The same inconveniences also arise in the preparation of high-drug-content premixes.

In some cases, the active ingredient cannot withstand a prolonged mixing, which inevitably causes heating of the product mass.

To overcome said inconveniences and guarantee a predetermined active ingredient content, the procedures of the prior art envisage an active ingredient overdosing. However, said method cannot be applied to substances with very low tolerance limits, which may be seriously harmful to livestock if taken in excess.

According to other procedures of the prior art, the active ingredient is "microencapsulated", i.e. produced in the form of single granules coated with a layer making said granules free-flowing, protecting the active ingredient from external agents, and preventing the product dustiness. Procedures of this type are described e.g. in British patent No. 2,016,043 and in French patent No. 2,447,748. However, should the active ingredient be present in the finished product in very small and strictly controlled amounts, the aforesaid procedures will not give satisfactory results in terms of active ingredient uniform distribution in the end product and absence of separation in phases during handling.

DESCRIPTION OF THE INVENTION

The premix of this invention consists of granules made of mineral and/or vegetable substances of particle size depending on the feed particle size (cf. J. P. Melcion "Conduite de mélange", Revue de l'alimentation animale, December 1989, pp. 27–29 and Héléne Nivet "Aspects pratiques du mélange", ibid., December 1989, pp. 30–31). The procedure under the invention provides the premix particle size desired.

The particle size of most commercially available feeds conveniently ranges between 100 and 1000 μm. Granules are free-flowing and non-caking, do not spread dust, are not electrostatically charged during handling, and do not modify the active ingredient bioavailability. During mixing, the granules of this invention prevent or minimize scales that usually form on the internal walls and other internal areas of the mixer.

From a structural point of view, the granules are made of a core, which consists of an organic, in particular vegetable, or inorganic material, of particle size preferably ranging between 100 and 800 μm, of a layer coating said core, which consists of a material soluble in aqueous liquids, in particular gastric juices, and of an active ingredient incorporated in said coating layer or firmly fixed thereto. The hardness of the coating layer may be adjusted by addition of appropriate amounts of softeners (or plasticizers), e.g. polyoxyethylenated glycerol ricinoleate, vegetable and/or mineral oils emulsions.

The following constituents and ingredients were used for the claimed premix formulation:

Core: a known feed-grade material, compatible with the final product, as to particle size and specific weight, may be used. It may be either inorganic, e.g. calcium phosphate, calcium carbonate, oligoelements salts, which may also be chelated, or of vegetable origin, such as granulated maize, soy-bean flour, bran, cereal-flakes, corncob meal, by-products in food industry, such as olive or grapes residues, used either singly or as a mixture thereof for distribution optimization in the finished feed.

Coating layer: consists of a water-soluble, crystallizable or solidifiable material, or of a powder capable of adhering to the core. The material selected shall form a layer having an appropriate hardness as required for the final product, withstand the stresses connected with the production process and finished feed handling, not alter the active ingredient properties, not affect the bioavailability of same, and not give rise to residues and scales in the mixer.

The following substances are suitable for the coating layer:

a) saccarides, e.g. saccharose, glucose, sorbitol;
b) starch derivatives, e.g. dextrin, gelling starches;
c) proteic sustances, e.g. albumin, pectin, gluten, gelatin;
d) cellulose derivatives, e.g. carboxymethylcellulose, hydroxyethylcellulose, methylcellulose, methylhydroxypropylcellulose;
e) guar flour, arabic gum;
f) water-soluble polymers, e.g. polyvinylpyrrolidone (PVP), polyethylene glycol (PEG), fatty acid soaps containing 8 or more C atoms, e.g. Ca, Zn, Na, Mg;
g) hydrogenated fats with melting temperature preferably ranging from 30° C. to 50° C., suitably combined with surfactants, which allow the dispersion of same when brought into contact with watery liquids;
h) water-soluble silicates;
i) Ca, Mg, Zn oxides and/or hydroxides.

Formation of the coating layer takes place by crystallization or solidification of the material that is applied in the form of a concentrated aqueous solution (syrup) containing a dispersed or emulsified material, if any. Crystallization results from the dehydration of the aforesaid aqueous solution effected by known dehydrating agents of the class of anhydrous salts (calcium sulphate hemihydrate, anhydrous sodium acetate, etc.) or other inorganic anhydrous compounds, such as silica or water-soluble silicates. The crystallization of sugars (saccharose, anhydrous glucose) or the solidification of the other aforementioned substances can also be promoted by substances that, though usually not considered "dehydrating", are water-miscible and have little or no solvent power for the crystallizable material (sugar): particularly convenient is polyethylene glycol with average molecular weight of 6000 and polyoxyethylenated derivatives, in particular polyoxyethylenated glycerol ricinoleate.

A characteristic of the claimed procedure is that ingredients having a low water content are used. Consequently, the aforesaid granule dehydration does not need any additional hot drying with heat supply from the outside. The coating layer may also consist of substances not included in the aforesaid class, which give a solid coating material by chemical reactions: some exemplary substances are calcium oxide, magnesium oxide, phosphoric acid, and acid phosphates.

Active ingredient

The active ingredients that may be used in the mixtures are the most varied food- and zootechnic-grade ones and comprise vitamins, amino acids, oligoelements, such as copper, cobalt, iron, zinc, manganese, molybdenum, chelated, if required, with amino acids, or selenium, etc., as well as pharmacologically active agents, such as growth promoters, antibiotics, sulphonamides, pesticides and, in general, substances exerting a therapeutic and/or preventive action.

The claimed premix preparation, obtained by mechanical mixing of the various ingredients, envisages also the use of coadjuvants and in particular:

Non-ionic surfactants and wetting agents, such as polyethylene glycol with molecular weight of 300, polyoxyethylene sorbitan monolaurate, in the liquid form preferably free from $H_2O$.

Free flowing agent in the form of fine powders, such as silicates (talc), silica, corncob meal.

Procedure

The core material is fed to a conventional mechanical mixer for powders. Preferably, a preliminary treatment of the core consisting in spraying said core material kept in motion in the mixer with a liquid acid (inorganic acids, organic acids, acid salts) should be performed. The amount of liquid acid to be used must be strictly limited. Said preliminary treatment is intended to increase the core specific surface (should the core materials be compact and smooth) and to improve its adhesion to the coating layer.

Once said possible acid treatment has been performed, the mixer is fed with an antitacking agent and kept in operation for some more time, in the order of few minutes. The antitacking agent is selected out of w/o type (water in oil) emulsions based on silicone oils, paraffin oil, ethyl oleate, higher alcohols in the liquid state, and edible oils added with preservatives and antioxidizers.

The agitated mixture is sprayed with surfactants and wetting agents, added with the crystallizable or solidifiable liquid material for core coating formation, and then with the active ingredient and the dehydrating agent.

Should the active ingredient be in such high amounts that a portion thereof does not adhere to the cores, said portion in excess will be converted into granules covered with the coating material previously fed in an amount exceeding the amount required for cores coating.

The mixer is then fed with the free flowing agent and mixing is continued for a few minutes.

The premix obtained is a fine, granular, free-flowing product with a dust emission, during the product handling stages, within the allowable safety threshold values, i.e. also below 0.1 mcg/filter, as determined by Heubach's apparatus and method.

Ingredients distribution in the product is perfectly uniform (with reference to a mass of several granules), the end product is free from phases separation phenomena, and the concentration variation coefficient is below ±5%. The active ingredient keeps encapsulated in or fixed to the core coating and does not tend to separate from it during the subsequent operations of mixing, bagging, transportation, etc.

The absence of dustiness in the premix is guaranteed by addition, during final mixing, of a small amount of hydrophilic polymeric material in the form of granules, either partially swollen by pretreatment with a mixture of glycols or polyethylene glycols and water, or previously exposed to an environment with controlled humidity.

The following examples are given to illustrate some possible embodiments of the present invention.

EXAMPLE 1

A 2000 l horizontal mixer was fed with hazel nut fibre meal (679 kg) of the following particle sizes $\geq$1000 µm 2.4% by wt.
$\geq$850 µm 34.6% by wt.
$\geq$600 µm 40.3% by wt.
$\geq$500 µm 13.1% by wt.
$\geq$425 µm 7.4 % by wt.
$\geq$350 µm 1.6% by wt.
$\geq$250 µm 0.5% by wt.
<250 µm 0.1% by wt.

The mixer being in operation, the meal was sprayed with paraffin oil (80 kg) and Tiamulin H-fumarate (200 kg), colouring agent E122 (1 kg), polyoxyethylenated glycerol ricinoleate (10 kg), a 70% aqueous solution of sorbitol (20 kg) were added. Mixing was continued for 15 min., then sorbitol powder (10 kg) was added and an additional 5 minutes' mixing was carried out. The product obtained had dustiness below 0.1 mcg/filter, determined by Heubach's method.

EXAMPLE 2

A 2000 l horizontal mixer was fed with hazel nut fibre meal (700 kg) of particle size as per Example 1, oxytetracycline (200 kg), and food-grade dextrin (20 kg).

The mixer being in operation, the mixture was sprayed, through 60 kg/min nozzles, with vaseline oil (30 kg) and a 70% aqueous solution of sorbitol (40 kg) containing 10% polyoxyethylene sorbitan monolaurate. Mixing was continued fop 6 min, then anhydrous sodium acetate (10 kg) was added, and an additional mixing was carried out. The product obtained (1000 kg) had dustiness below 0.1 mcg/filter, determined by Heubach's method.

EXAMPLE 3

A 2000 l horizontal mixer was fed with granular calcium carbonate (460 kg) of the following particle sizes $\geq$850 µm 0.1% by wt.
$\geq$600 µm 9.5% by wt.
$\geq$500 µm 26.5% by wt.
$\geq$425 µm 24.0% by wt.
$\geq$350 µm 19.6% by wt.
$\geq$250 µm 19.9% by wt.
$\geq$180 µm 0.3% by wt.
$\geq$120 µm 0.0% by wt.
<120 µm 0.1% by wt.

The mixer in operation was fed with polyoxyethylenated glycerol ricinoleate (11 kg), F.U. grade paraffin oil (11 kg), dextrin (11 kg) and a 70% aqueous solution of sorbitol (60 kg). A 4 minutes' mixing was carried out. The mixer in operation was then fed with sodium selenite (25 kg; Se content 45%). After a 3 minutes' mixing, the mixer was fed with sorbitol powder (30 kg) and after an additional 3 minutes' mixing, with granular calcium carbonate (460 kg) and anhydrous sodium acetate (32 kg). After a 4 minutes' mixing, a silicate (20 kg) as free flowing agent was added and mixing was continued for additional 3 minutes.

EXAMPLE 4

A 2000 l Nauta mixer was fed with hazel nut fibre meal treated with propionic acid (1560 kg) of particle size as per Example 1. The mixer in operation was fed with paraffin oil (125 kg) and a 15 to 20 minutes' mixing was carried out. The mixer was then fed with dextrin (39 kg) together with oxytetracycline dihydrate (199 kg). After an additional 30 minutes' mixing, polyoxyethylenated glycerol ricinoleate (15 kg) together with a 70% aqueous solution of sorbitol (12 kg) were added. After a 20 minutes' mixing, paraffin oil (10 kg) was added and mixing was continued for 10 minutes. The product obtained had dustiness below 0.1 mcg.

EXAMPLE 5

A 500 l horizontal mixer was fed with corncob meal (154.5 kg) of the following particle sizes $\geq$600 μm 2.3% by wt.
$\geq$500 μm 19.6% by wt.
$\geq$425 μm 29.7% by wt.
$\geq$350 μm 7.3% by wt.
$\geq$250 μm 28.3% by wt.
$\geq$180 μm 9.4% by wt.
$\geq$120 μm 3.3% by wt.
<120 μm 0.1% by wt.

polyoxyethylenated glycerol ricinoleate (10 kg), paraffin oil (7 kg), and silicone oil (3 kg).

After a 5 minutes' mixing, the mixer was fed with 3-methyl-6-[7-ethyl-4 -hydroxy-3,5-dimethyl-6-oxo-7-[5-ethyl-5-hydroxy-6-methyl-2 -tetrahydropyranyl)-2-tetrahydropuryl]heptyl] salicylic acid sodium salt (Lasalocid sodium salt) (20 kg), dextrin (3.5 kg) and polyoxyethylenated glycerol ricinoleate (2.5 kg). Mixing was continued for 5 minutes. The mixer was then fed with additional 20 kg of Lasalocide sodium salt and 3.5 kg of dextrin, while mixing was continued for 3 minutes, and again with polyoxyethylenated glycerol ricinoleate (2.5 kg). Lasalocid sodium salt (20 kg), dextrin (3.5 kg) and a 70% aqueous solution of sorbitol (5 kg) and mixing was continued for 5 minutes. The bulk density of the product obtained was 0.48. Monensin's determination on a sample gave a value of 20.4%.

EXAMPLE 6

A 4000 l horizontal mixer was fed with granular calcium carbonate (1400 kg) of particle size as per Example 3. The mixer in operation was fed with polyoxyethylenated glycerol ricinoleate (20 kg), F.U. grade paraffin oil (20 kg), dextrin (20 kg), and a 70% aqueous solution of sorbitol (120 kg). After a 3 minutes' mixing, pure salinomycin (260 kg) was added and mixing was continued for 6 min. Then magnesium oxide (10 kg) and sorbitol (60 kg) were added. After a 3 minutes' mixing, anhydrous sodium acetate (60 kg) was added and after an additional 4 minutes' mixing a silicate (30 kg) as a free flowing agent was added.

EXAMPLE 7

A 2000 l horizontal mixer was fed with calcium carbonate (720 kg) of the following particle sizes $\geq$600 μm 0.03% by wt.
$\geq$500 μm 0.11% by wt.
$\geq$425 μm 10.08% by wt.
$\geq$350 μm 21.56% by wt.
$\geq$250 μm 47.16% by wt.
$\geq$180 μm 17.46% by wt.
$\geq$100 μm 2.83% by wt.
<100 μm 0.77% by wt.

The mixer in operation was fed with F.U. grade paraffin oil (10 kg), dextrin (10 kg) and a 70% aqueous solution of sorbitol (60 kg) and, after a 5 minutes' mixing, with a mixture of sulphadiazine (12.5 kg) and trimethoprim (2.5 kg).

Mixing was continued for 20 min., then sorbitol (30 kg) and a free flowing agent based on silicates and silica dioxide (10 kg) were added.

The product discharged had dustiness below 0.1 mcg/filter (Heubach's test) and the following particle sizes:

$\geq$850 μm 0.40% by wt.
$\geq$600 μm 11.87% by wt.
$\geq$500 μm 23.74% by wt.
$\geq$425 μm 27.53% by wt.
$\geq$350 μm 16.59% by wt.
$\geq$250 μm 17.67% by wt.
$\geq$180 μm 1.77% by wt.
$\geq$100 μm 0.37% by wt.
<100 μm 0.06% by wt.

EXAMPLE 8

By operating under the same conditions and with the same ingredients as in Example 7, except that dextrin was used instead of polyvinylpyrrolidone, a product of the following particle sizes was obtained $\geq$850 μm 16.84% by wt.
$\geq$600 μm 13.29% by wt.
$\geq$500 μm 12.13% by wt.
$\geq$425 μm 24.48% by wt.
$\geq$350 μm 16.66% by wt.
$\geq$250 μm 14.86% by wt.
$\geq$180 μm 0.98% by wt.
$\geq$100 μm 0.58% by wt.
<100 μm 0.18% by wt.

EXAMPLE 9

A 2000 l horizontal mixer was fed with calcium carbonate (720 kg) of particle size as pep Example 3.

The mixer in operation was fed with polyoxyethylenated glycerol ricinoleate (10 kg), F.U. grade paraffin oil (10 kg), food-grade dextrin (10 kg) and a 70% aqueous solution of sorbitol (50 kg). After a 3 minutes' mixing, 46% cobalt carbonate (110 kg) was added. After a 3 minutes' mixing, sorbitol (25 kg) was added and mixing was continued for 10 minutes. Then the mixer was fed with anhydrous sodium acetate (40 kg) and, after a 5 minutes' mixing, with a free flowing agent (25 kg) based on silicates and silica dioxide.

The product discharged had dustiness below 0.1 mcg/filter (Heubach's test).

EXAMPLE 10

A 2000 l mixer was fed with hazel nut fibre meal (675 kg) of particle size as per Example 1.

The mixer in operation was fed with F.U. grade paraffin oil (60 kg), glycerol-polyethylene glycol ricinoleate (60 kg), a 40% water solution of polyvinylpyrrolidone (20 kg), and a 70% aqueous solution of sorbitol (40 kg). After a 4 minutes' mixing, the mixer was fed with cholesterin sulphate (120 kg) and, after a 6 minutes' mixing, with anhydrous sodium acetate (20 kg). Mixing was continued for 4 minutes, then sodium carboxymethylcellulose (5 kg), partially swollen with a 2:1 mixture of propylene glycol and water, was added. The product discharged had dustiness below 0.04 mcg (Heubach's test).

EXAMPLE 11

A 2000 l horizontal mixer was fed with granular calcium carbonate (750 kg) of particle size as per Example 3.

The mixer in operation was fed with glycerol-polyethylene glycol ricinoleate (10 kg), F.U. grade paraffin oil (12 kg), arabic gum (10 kg), and glucose syrup, 45 Bé (50 kg). After a 3 minutes' mixing, furazolidone (100 kg) was added and mixing was continued for 4 minutes. Then anhydrous dextrose (25 kg) and anhydrous sodium acetate (20 kg) and, 5 minutes later, a free flowing agent (18 kg) based on silica dioxide and silicates were added. The product discharged had dustiness below 0.01 mcg (Heubach's test).

EXAMPLE 12

A 4000 l horizontal mixer was fed with calcium carbonate (1460 kg) of particle size as per Example 3.

The mixer in operation was fed with polyethylene glycol glycerol ricinoleate (20 kg), F.U. grade paraffin oil (20 kg), dextrin (20 kg) and a 70% aqueous solution of sorbitol (100 kg). After a 2 minutes' mixing, Olaquindox (200 kg) was added and mixing was continued for 6 minutes; thereafter sorbitol (50 kg) and, after 2 minutes, anhydrous sodium acetate (80 kg) were added. Mixing was continued for 3 minutes, then a free flowing agent (40 kg) based on silica dioxide and silicates was added. The product discharged had dustiness below 0.01 mcg (Heubach's test).

EXAMPLE 13

A 4000 l horizontal mixer was fed with calcium carbonate (1357 kg) of particle size as per Example 3.

The mixer in operation was fed with glycerol-polyethylene glycol ricinoleate (20 kg), F.U. grade paraffin oil (20 kg), arabic gum (20 kg), and a 70% aqueous solution of sorbitol (100 kg). After a 3 minutes' mixing, 363 kg of a mixture of oligoelements (133 kg manganese oxide, 131.6 kg iron carbonate, 78 kg zinc oxide, 15.6 kg copper oxide, 2.8 kg cobalt carbonate, and 2 kg potassium iodide) was added. After a 6 minutes' mixing, sorbitol (50 kg) and anhydrous sodium acetate (50 kg) were added. Mixing was continued for 3 minutes, then a free flowing agent (40 kg) based on silica dioxide and silicates was added. The product discharged had dustiness below 0.1 mcg (Heubach's test).

EXAMPLE 14

A 4000 l horizontal mixer was fed with hazel nut fibre meal (1152 kg) of particle size as per Example 1.

The mixer in operation was fed with glycerol-polyethylene glycol ricinoleate (100 kg), F.U. grade paraffin oil (120 kg), polyvinylpyrrolidone (20 kg), and a 70% aqueous solution of sorbitol (80 kg). After a 3 minutes' mixing, 318 kg of a vitamin mixture (2 kg folic acid, 40 kg nicotinic acid, 10 kg 2% biotin, 36 kg calcium pantothenate, 40 kg vitamin A 500, 4 kg vitamin B1, 12 kg vitamin B2, 80 kg vitamin B12 (1:1000), 10 kg vitamin D3 400, 80 kg vitamin E 500, 34 kg vitamin K) was added. After an additional 6 minutes' mixing, sorbitol (50 kg) and anhydrous sodium acetate (80 kg) were added. After a 3 minutes' mixing, a free flowing agent (40 kg) based on silica dioxide and silicates was added.

A dustless product was discharged.

EXAMPLE 15

A 4000 l horizontal mixer was fed with calcium carbonate (480 kg) of particle size as per Example 3.

The mixer in operation was fed with polyoxyethylenated glycerol ricinoleate (30 kg), F.U. grade paraffin oil (30 kg), food-grade dextrin (60 kg), water (40 kg), and iron carbonate (1200 kg). After a 3 minutes' mixing, the mixer was fed with sorbitol (20 kg) and anhydrous glucose (40 kg), then, after a 7 minutes' mixing, with anhydrous sodium acetate (60 kg) and, after a 2 minutes' mixing, with a free flowing agent (40 kg) based on silica dioxide and silicates. After an additional 2 minutes' mixing, 2000 kg of a dustless product of the following particle sizes was discharged:

$\geq$1410 µm 1.7% by wt.
$\geq$1000 µm 10.5% by wt.
$\geq$850 µm 16.9% by wt.
$\geq$600 µm 31.6% by wt.
$\geq$500 µm 18.1% by wt.
$\geq$425 µm 9.1% by wt.
$\geq$350 µm 5.6% by wt.
$\geq$250 µm 4.6% by wt.
>250 µm 1.8% by wt.

EXAMPLE 16

A 4000 l horizontal mixer was fed with calcium carbonate (420 kg) of particle size as per Example 3.

The mixer in operation was fed with polyoxyethylenated glycerol ricinoleate (30 kg), F.U. grade paraffin oil (30 kg), food-grade dextrin (60 kg), water (40 kg), and iron carbonate (1,162 kg), calcium iodate (64 kg), cobalt carbonate (44 kg), and sodium selenite (4 kg). After a 3 minutes' mixing, the mixer was fed with sorbitol (20 kg) and anhydrous glucose (40 kg), then, after a 7 minutes' mixing, with anhydrous sodium acetate (56 kg) and, after a 2 minutes' mixing, with a free flowing agent agent (30 kg) based on silica dioxide and silicates. After an additional 2 minutes' mixing, 2000 kg of a dustless product was discharged. The product consisted of 25% by wt. iron, 2% by wt. iodine, 1% by wt. cobalt, and 0.1% by wt. selenium and had the following particle sizes $\geq$1410 µm 0.3% by wt.
$\geq$1000 µm 3.9% by wt.
$\geq$850 µm 11.2% by wt.
$\geq$600 µm 36.4% by wt.
$\geq$500 µm 21.7% by wt.
$\geq$425 µm 14.1% by wt.
$\geq$350 µm 7.4% by wt.
$\geq$250 µm 4.7% by wt.
>250 µm 0.3% by wt.

I claim:

1. A process for preparing a granular premix suitable for distributing one or more active ingredients in an animal feed, comprising affixing the active ingredient(s) in an essentially uniform manner to the surface of core particles of feed-grade material having a diameter comparable in size to that of the particles of the animal feed.

2. The process of claim 1 wherein the core particles of feed-grade material have a diameter ranging between about 100 and 1000 μm.

3. The process of claim 1 wherein the active ingredient is affixed to the core of feed grade material by coating said core with a layer of water-soluble material to which the active ingredient is incorporated or affixed.

4. The process of claim 3 wherein the layer of water-soluble material to which the active ingredient is incorporated or affixed is formed by mixing the core of feed grade material in a powder mixer with an aqueous mixture of the water-soluble material and the active ingredient in the presence of an antitacking agent, and promoting crystallization or solidification of the water-soluble material by introducing a dehydrating agent.

5. The process of claim 4 wherein the antitacking agent is a water-in-oil type emulsion of an oily substance selected from the group consisting of silicone oils, edible oils, paraffin oils, ethyl oleate, and higher alcohols in liquid state.

6. The process of claim 4 wherein the water-soluble material is a concentrated aqueous saccharide solution and the dehydrating agent is selected from the group consisting of anhydrous salts and water-miscible substances with no solvent power for sugar.

7. The process of claim 6 wherein the dehydrating agent is an anyhdrous salt selected from the group consisting of sodium acetate, calcium sulfate hemihydrate and anhydrous silicates.

8. The process of claim 6 wherein the dehydrating agent is a water-miscible substance with no solvent power for sugar selected from the group consisting of polyethylene glycol with a molecular weight of 6000 and polyoxyethylenated derivatives such as polyoxyethylenated glycerol ricinoleate.

9. The process of claim 6 wherein essentially all of the water present in the sugar solution is absorbed by the dehydrating agent.

10. Process of claim 4 wherein said water soluble material comprises a saccharide.

11. Process of claim 4 wherein said water soluble material comprises dextrin.

12. Process of claim 4 wherein said water soluble material comprises polyvinylpyrrolidone.

13. A premix suitable for uniform distribution of one or more active ingredients in animal feeds, comprising core particles of feed grade material having a diameter comparable in size to that of the particles of the animal feed, said core particles having the active ingredient(s) essentially uniformly affixed thereto.

14. The premix of claim 13 wherein the core particles of feed grade material have a diameter ranging between about 100 and 1000 μm.

15. The premix of claim 13 wherein said core particles are coated with a layer of water soluble material having the active ingredient(s) incorporated in or fixed thereto.

16. A premix suitable for uniform distribution of one or more active ingredients in animal feeds, comprising core particles of feed grade material having a diameter ranging between about 100 and 1000 μm, said core being coated with a layer of water soluble material having the active ingredient (s) incorporated in or affixed thereto.

17. The premix of claim 16 wherein the layer of water soluble material having the active ingredient(s) incorporated in or affixed thereto is obtained by promoting the crystallization or solidification of the water-soluble material with a dehydrating agent.

18. The premix of claim 17 wherein the water soluble material comprises a saccharide and the dehydrating agent is selected from the group consisting of anhydrous salts, water soluble silicates, water miscible polyethoxylated derivatives having no solvent power for sugar.

19. The premix of claim 18 wherein the dehydrating agent comprises an anhydrous salt selected from the group consisting of sodium acetate, calcium sulfate hemihydrate and anhydrous silicates.

20. The premix of claim 18 wherein the dehydrating agent comprises a water-miscible substance with no solvent power for sugar selected from the group consisting of polyethylene glycol with molecular weight of 6000 and polyoxyethylenated derivatives such as polyoxyethylenated glycerol ricinoleate.

21. The process of claim 1 wherein the core particles of feed grade material have a diameter ranging between about 100 and 800 μm.

22. The process of claim 13 wherein the core particles of feed grade material have a diameter ranging between about 100 and 800 μm.

23. The process of claim 22 wherein the core particles of feed grade material have a diameter ranging between about 100 and 800 μm.

* * * * *